(12) United States Patent
Weiberle et al.

(10) Patent No.: US 7,058,459 B2
(45) Date of Patent: Jun. 6, 2006

(54) METHOD AND DEVICE FOR OPERATING A DECENTRALIZED CONTROL SYSTEM

(75) Inventors: Reinhard Weiberle, Vaihingen/Enz (DE); Bern Kesch, Hemmingen (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 10/183,338

(22) Filed: Jun. 27, 2002

(65) Prior Publication Data

US 2003/0014129 A1     Jan. 16, 2003

(30) Foreign Application Priority Data

Jun. 30, 2001  (DE) ................................ 101 31 806

(51) Int. Cl.
*G05B 11/01* (2006.01)
(52) U.S. Cl. ............................ 700/19; 700/20; 303/20; 361/23; 361/62
(58) Field of Classification Search ................. 700/19, 700/20; 361/23, 62; 340/438, 439; 303/20
See application file for complete search history.

(56) References Cited

U.S. PATENT DOCUMENTS 5,255,962 A * 10/1993 Neuhaus et al. ............ 303/188
5,717,134 A * 2/1998 Schlichenmaier et al. .... 73/121
5,752,748 A * 5/1998 Schramm et al. ............. 303/20
5,952,799 A * 9/1999 Maisch et al. ............... 318/362
6,023,399 A * 2/2000 Kogure ......................... 361/23
6,189,981 B1 * 2/2001 Niedermeier ................ 303/20
6,202,018 B1 * 3/2001 Stumpe et al. ................ 701/70
6,237,729 B1 * 5/2001 Blattert ........................ 188/158
6,318,819 B1 * 11/2001 Bohm et al. ................. 303/122
6,349,996 B1 * 2/2002 Heckmann et al. .... 303/122.04
6,449,551 B1 * 9/2002 Wrede .......................... 701/70
6,577,906 B1 * 6/2003 Hurtado et al. ................ 700/2

FOREIGN PATENT DOCUMENTS

| DE | 198 26 131 | 12/1999 |
| DE | 198 26 134 | 12/1999 |
| DE | 199 37 156 | 2/2001 |

* cited by examiner

*Primary Examiner*—Anthony Knight
*Assistant Examiner*—Thomas Pham
(74) *Attorney, Agent, or Firm*—Kenyon & Kenyon, LLP

(57) ABSTRACT

A method of and a device for operating a decentralized control system, at least two control units are provided to control at least one actuating element each. In this control, different operating modes are to be differentiated, the selection of the respective operating mode of the individual control unit is made by the at least two control units on the basis of at least one status signal.

7 Claims, 3 Drawing Sheets

METHOD AND DEVICE FOR OPERATING A DECENTRALIZED CONTROL SYSTEM

FIELD OF THE INVENTION

The present invention relates to a method and a device for operating a decentralized control system.

BACKGROUND INFORMATION

In automotive engineering, decentralized systems are often used for control, i.e., control systems including a plurality of control units which are locally distributed for controlling sub-components of the system to be controlled. Examples of this in automotive engineering include the control of brake systems, control of engines including multiple cylinder blocks, etc. In principle, all these decentralized control units process their control functions independently of one another. However, there are operating phases in which the activities of the decentralized control units are coordinated, e.g., when the overall system performs a pre-drive check or when special control functions are used to shut down the system as a whole.

German Published Patent Application No. 198 26 131 describes a decentralized control system on the example of a control system for operating the brake system of a motor vehicle. The structural features of this decentralized system include a pedal module for central detection of the driver's intent, four wheel modules for regulation of brake actuators for each wheel individually and a processing module for calculation of higher-level-brake functions (e.g., an electronic stability program). The individual modules communicate with one another through one or more communication systems. The internal structure of a wheel module includes various logic levels. A first logic level includes at least the calculation of the control and regulating functions for the wheel brakes, while the other logic levels contain various functions for computer monitoring and function testing of the first level. Calculation of the control and regulating functions may include different operating modes, depending on the regulating principle and the scope of function of the overall system. For example, if the wheel braking torque is used as a regulating variable, it is necessary to ensure that it is possible to control or regulate the wheel brake even when the vehicle is at a standstill, although no wheel braking torque is it detectable when the vehicle is at a standstill.

German Published Patent Application No. 199 37 156 also relates to the control of a brake system, but it describes a different structure of such a decentralized control system. According to that patent, a wheel brake module which implements the control and regulating functions is assigned to each of the four wheel brakes. There is no central detection of the driver's intent here. Instead, at least one actuation signal of the brake pedal is sent to each wheel brake module. The wheel brake modules communicate via at least one communication system.

German Published Patent Application No. 198 26 134 describes the control of a wheel brake as part of a wheel braking torque regulating circuit which switches from wheel braking torque regulation to angle-of-rotation regulation or position regulation on detecting that the vehicle is at a standstill. When the vehicle velocity drops below a vehicle limiting velocity from which it is deduced that the vehicle is at standstill or that standstill is immediately imminent, a fictitious actual braking torque is determined from the measured angle of rotation of the motor of the wheel brake actuator and/or the position of a movable element in the area of the wheel brake or the actuator, and this fictitious actual braking torque is sent to the braking torque regulator as an actual input variable.

SUMMARY OF THE INVENTION

Through the selection of the respective operating mode of the wheel module with the help of defined status signals of the overall system and/or at least one operating variable of the vehicle and/or the system, a unique interface definition is supplied, and the creation of a modulator decentralized control system is supported or made possible.

The pre-drive check and shutdown program do not require any input data from other modules, so the choice of operating mode with regard to these two operating modes is made solely on the basis of at least one status signal. Therefore, these functionalities may be implemented by using a low bus load.

If the status signals, i.e., operating variable signals, used for selection of the operating mode originate from a central unit, their implementation in terms of hardware does not affect the architecture of the decentralized control units because information is exchanged between the control units on the basis of defined signals.

When using a braking torque regulation which is enabled at a standstill by regulation of the angle of rotation, it may be especially advantageous to select the operating mode on the basis of a representative vehicle velocity signal. Therefore, reliable switching is guaranteed because this representative vehicle velocity is formed from several items of wheel rotational speed information. Switching operating mode may thus also be implemented even if the wheel rotational speed signal is faulty.

Another important advantage may be that the selection of operating mode of each decentralized control unit is made by that unit itself. This guarantees that neither other control units nor optional central units require information regarding concrete embodiment and functioning of the respective decentralized control unit.

The present invention is explained in greater detail below on the basis of the example embodiments illustrated in the drawings.

DETAILED DESCRIPTION

Figure 1:
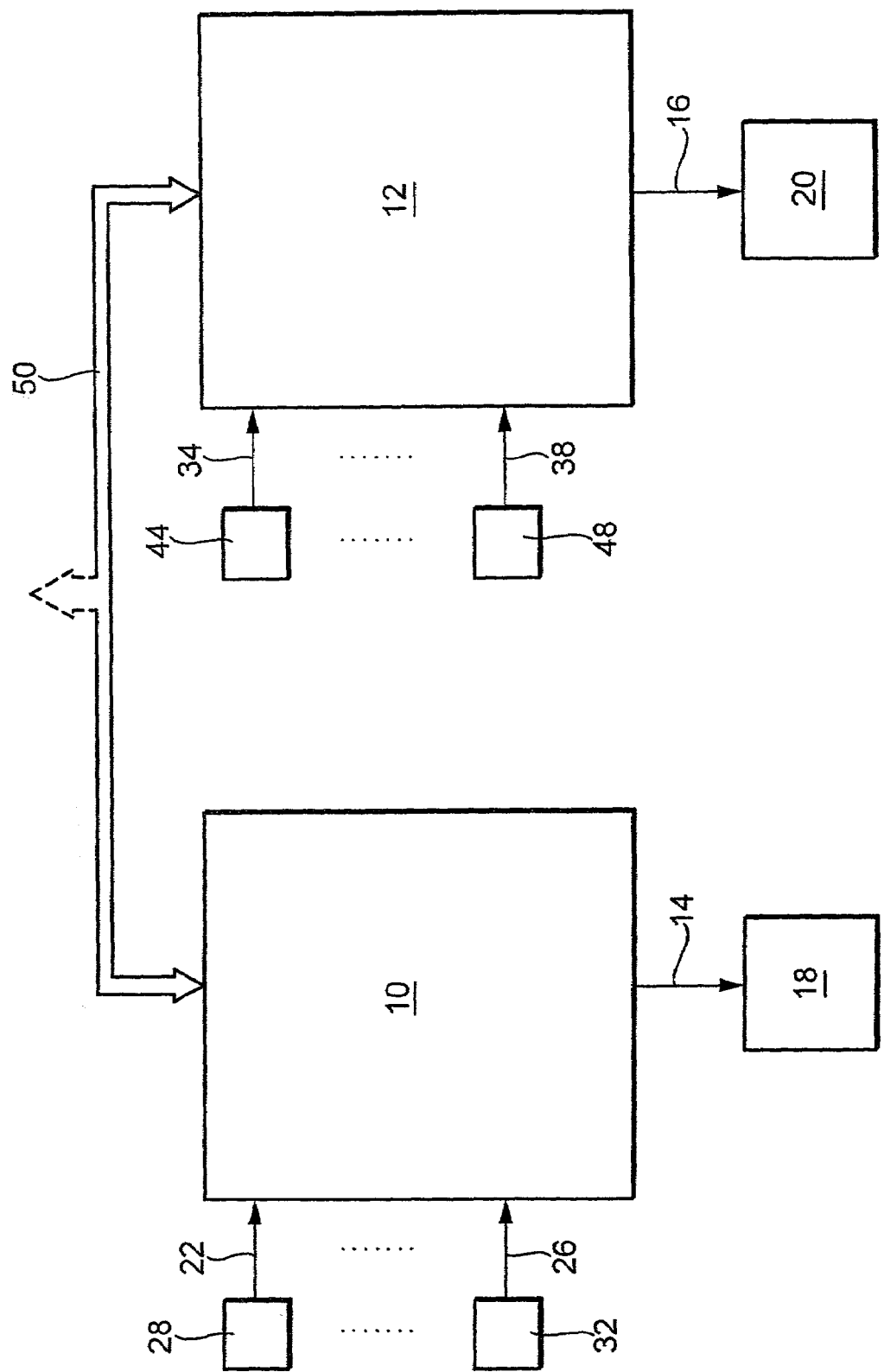
FIG. 1 shows a block diagram of a decentralized control system on the example of two decentralized control units.

FIG. 1 shows a block diagram of a decentralized control system and a detail thereof including two locally separate control units 10 and 12. In an example embodiment, the control units are control units for controlling at least one wheel brake each or wheel brakes of a vehicle axle. In other example embodiments, control units 10 and 12 each control at least one actuating element of different cylinder blocks of an internal combustion engine, steering actuators at the wheels of the vehicle, drive motors at individual vehicle wheels, etc. Control units 10, 12 are connected to at least one actuating element 18, 20 by at least one control line 14, 16. Furthermore, control unit 10 includes input lines 22–26 from measurement devices 28–32. Measurement devices 28–32 detect operating variables in the area of control unit 10, e.g., the wheel rotational speed, braking torque, braking force, brake pressure, etc. in the example embodiment of a brake control or in the case of an engine control they detect the corresponding operating variables of the respective cylinder block, etc. The same thing is also true of control unit 12 to which input lines 34–38 lead from measurement devices 40–44. Two control units 10 and 12 are interconnected by at least one communication system 50. Optionally other decentralized control units or at least one central control unit is/are connected to this communication system (represented by a broken-line arrow). Control units 10 and 12 themselves include at least one microcomputer which processes the information supplied via the respective input lines and the communication system. Various programs are stored in the microcomputer, i.e., in a memory assigned to it, for executing the required control functions implemented by the respective control unit.

Various operating modes in which all control units jointly have certain program steps to perform may be differentiated in operation of the overall control system.

One example that may be mentioned is the pre-drive check, in which the overall control system is checked out before beginning to drive; this includes, for example, special movements of the actuators, the shutdown program which guarantees a defined shutdown of the system after opening the ignition switch, normal operation and emergency operation. Furthermore, as part of normal operation in the example embodiment of an electromechanical brake system, a distinction is to be made between braking torque regulation and angle-of-rotation regulation as operating modes. Each control unit selects the instantaneous operating mode for itself. This is done on the basis of status signals which describe the operating state of the overall system and which, depending on example embodiment, are sent over communication system 50 from a central control unit or from another control unit which assumes the function of forming these overall system status signals. For example, when the ignition switch is closed, an overall status signal is formed in the central control unit or in the selected control from corresponding status signals of the decentralized control units, or a status signal originally generated in the central or selected control unit is generated and sent to the decentralized control units. Then the decentralized control units perform the pre-drive check. When this is concluded, each control unit sends an end status signal to the central or selected control unit, where the status of the overall system is found to be normal operation in the case when all individual signals are present and a corresponding overall system status signal is sent back to the control units, which then implement normal operation. In normal operation, depending on the assigned control functions, the respective at least one actuating element is actuated accordingly. If a control unit detects an error, it sends a corresponding error message to the central or selected control unit which then detects emergency operation as the overall system operating state, depending on the type of error, and sends corresponding status signals to the control units. The control units then run through the emergency operation programs. A similar procedure is followed in shutdown. When turning off the system, status signals formed in the central or selected control unit or formed originally in the central or selected control unit from corresponding status signals of the decentralized control units lead to activation of the shutdown programs in the individual control units. Depending on the status signals of the overall system, the decentralized control units thus select the instantaneous operating mode and perform the functions provided for there independently of other control units.

The status signals are a signal of a predetermined value which is sent to all the decentralized control units in question.

In the application of a brake system which regulates the brake application force on the wheel as part of a braking torque regulation loop, it is also provided that, depending on a driving speed which is determined centrally, the information regarding a transition to a standstill or immediately imminent transition to standstill is relayed to the individual control units, which then switch from braking torque regulation to angle-of-rotation regulation or position regulation, i.e. modify the braking torque regulation so that angle-of-rotation regulation or position regulation of the brake actuator is implemented.

Figure 2:
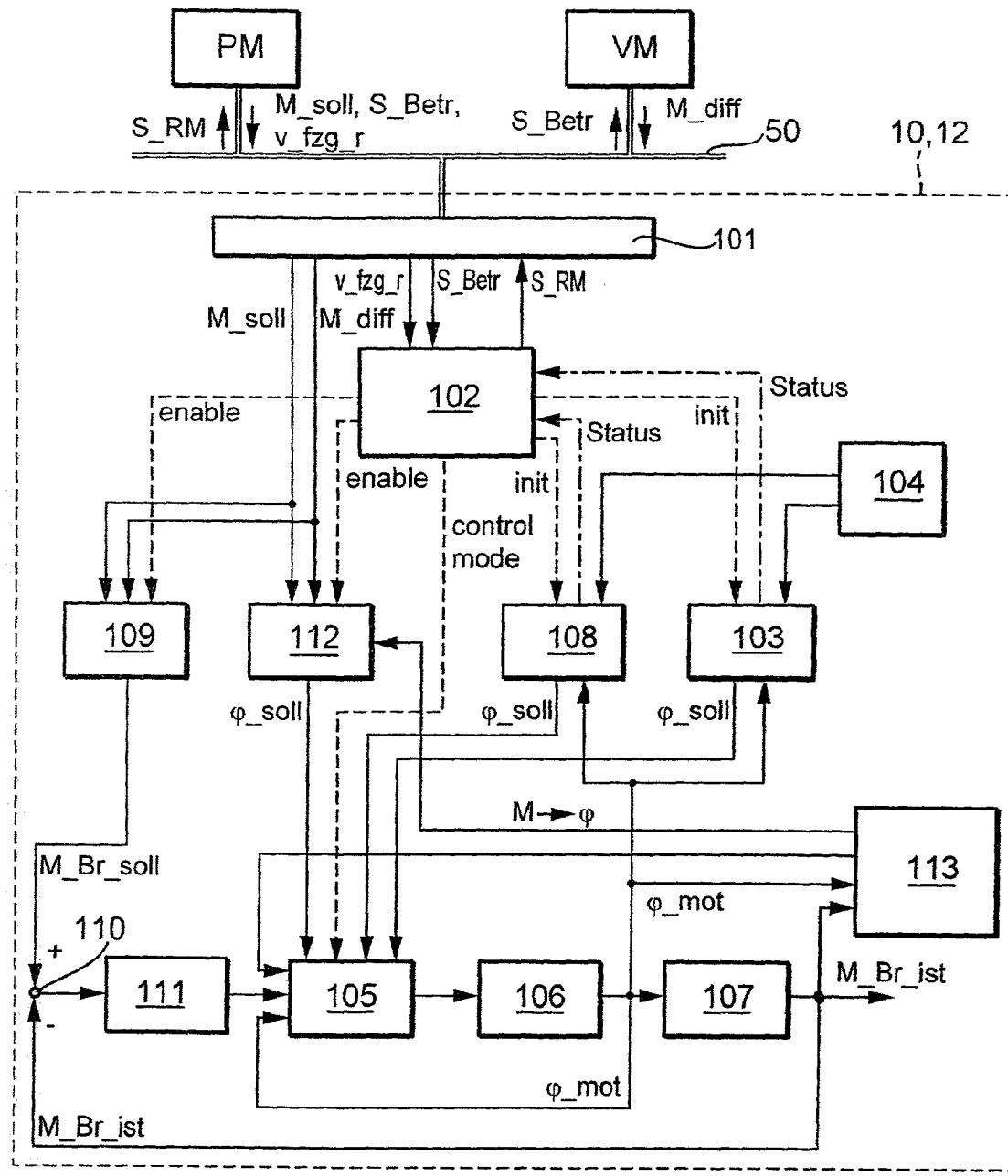
FIG. 2 shows a flow chart in a wheel module as part of an example embodiment on the example of a brake having electromechanical brake application.

FIG. 2 shows a flow chart in a decentralized control unit, namely wheel module 10, 12, which operates at least one wheel brake. In the example embodiment shown here, communication system 50 leads from wheel module 10 to a central driver's intent detection module PM and a processing module VM for the brake functions for each individual wheel. The communication system is connected by a bus interface module 101 in the wheel module. At least one braking torque setpoint (M_Soll, M_dif), a status signal S_Betr for the operating state of the overall system and representative vehicle velocity v_fzg_r are sent to wheel module 10 from the central control units.

At least one of the following functions is provided in the wheel module; regulation of the respective brake actuator, autonomous switching to a second regulation principle when the vehicle is at a standstill in the case of braking torque regulation, pre-drive check when turning on the system, a shutdown program for when the system is turned off, and emergency operation programs. The functions mentioned here are to be implemented in the wheel module. This results in various operating modes of the wheel module, e.g., regulation with braking torque assignment, regulation with engine angle-of-rotation assignment, pre-drive check, shutdown program, emergency operation. Switching between these operating modes occurs in the wheel module on the basis of at least one operating status signal and/or at least one operating variable signal, in the present case a vehicle velocity signal. These signals are sent from the pedal module to the wheel modules cyclically in the example embodiment illustrated in FIG. 2. In other cases, as described above, this function is implemented by another central controller or a selected wheel module. The operating status signal represents the status of the system as a whole. This is formed, for example, on the basis of individual status signals from the wheel modules, energy management of the vehicle electrical system, etc. In one example embodiment, the operating status signal also includes the error status of the system and information regarding the release strategy to be derived from that (emergency operation). Furthermore, in one example embodiment the operating status signal contains initialization data for the pre-drive check and/or for the shutdown program. Vehicle velocity signal v_fzg_r is determined in a central control unit or in a selected wheel module on the basis of several items of wheel rotational speed information (e.g., from at least three wheels) so that reliable information regarding whether the instantaneous vehicle velocity is above or below the limit velocity indicative of the standstill zone is obtained.

An operating variable signal and/or status signal is sent to operating mode selection stage 102 in the wheel module. As a function of at least one of these signals, this stage forms enable signals, init signals and control mode signals, which then put the respective wheel module in a state suitable for implementation of the corresponding operating mode. The flow chart in FIG. 3 shows the strategy implemented in operating mode selection 102.

Figure 3:
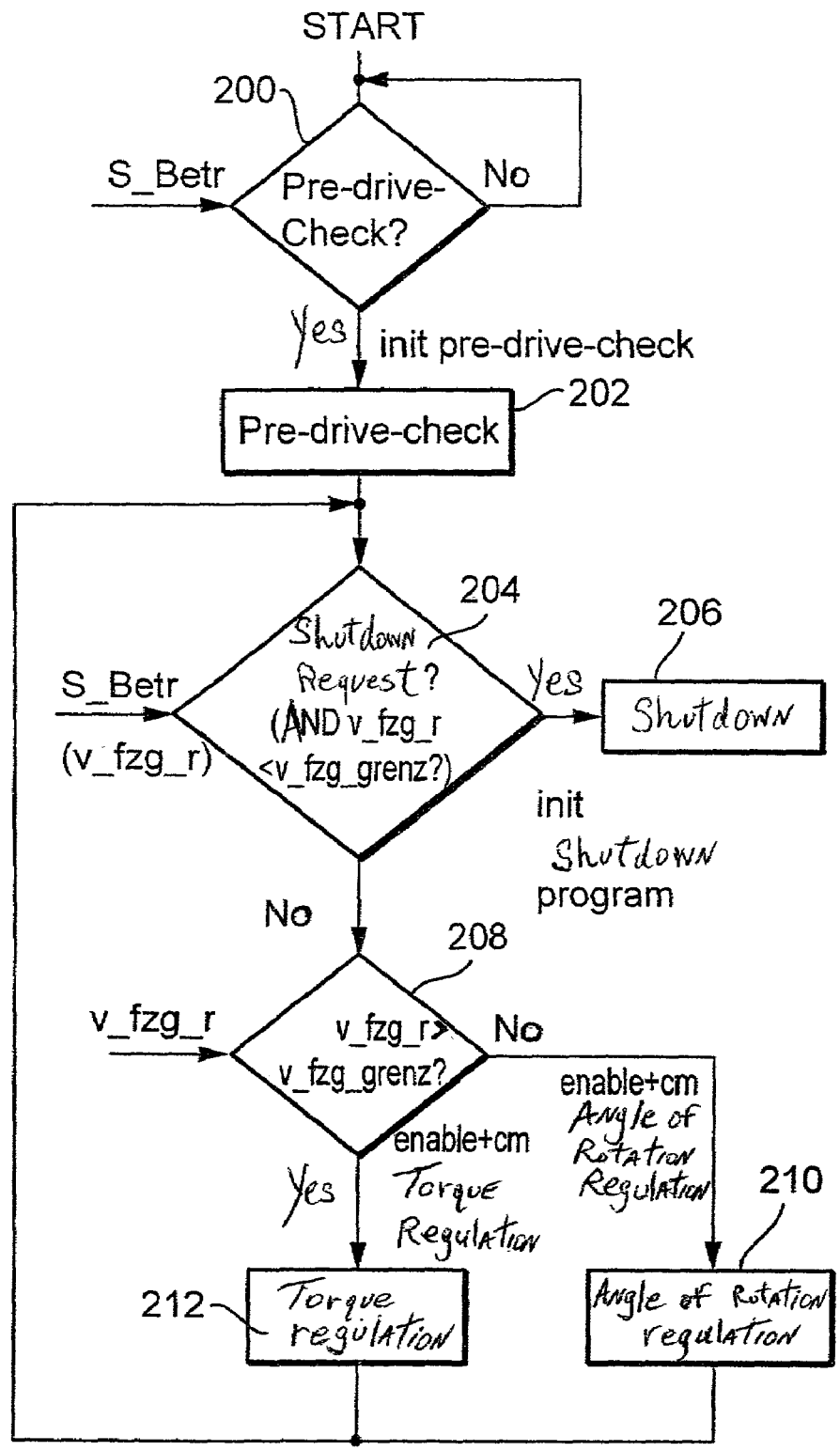
FIG. 3 shows a flow chart outlining the specific procedure for selection of operating modes in this example.

The flow chart illustrated in FIG. 3 represents a program which selects the individual operating modes as a function of the state signals and/or operating variable signals supplied. The program outlined by the flow chart according to FIG. 3 is started by turning on the power supply. In first step 200, a decision is made on the basis of operating status signal S BETR as to whether a pre-drive check is to be performed. This query is repeated until the operating status signal assumes a corresponding value. This is usually the case when all control units have been initialized. If the operating status signal has the corresponding value, then the pre-drive check is performed according to step 202. The selection module generates a corresponding init signal. In the example embodiment of a brake system, this pre-drive check includes actuation of the wheel brake and utilization of the acknowledgment messages associated with this. After conclusion of the pre-drive check, the normal operating mode is initiated. The selection module generates corresponding control signals. In step 204 which follows step 202, a check is performed on the basis of the operating status signal to determine whether there is a shutdown request. This is the case when a defined shutdown of the system is performed due to disconnecting the power supply voltage (in the case of a brake system, e.g., establishing a parking brake function). If the operating status signal has the corresponding value, then the selection module generates a corresponding init signal which is used to start the shutdown program represented as step 206. In a example embodiment, the vehicle velocity is also checked in step 204 and an init signal is generated for the shutdown program only when there is a shutdown request as well as a vehicle velocity below limit velocity v_fzg_grenz. If there is no shutdown request or if, as in the example embodiment, the vehicle velocity is greater than the limit velocity, then in step 208 which follows step 204, a check is performed on the basis of vehicle velocity v_fzg_r to determine whether it is greater than limit velocity v_fzg_grenz. If this is not the case, i.e., if the vehicle status is evaluated as being at a standstill, than an enable signal and a control mode signal for activation of the angle-of-rotation regulation are generated by the selection mode. This is performed in step 210, for example, according to a conventional method. If the vehicle velocity is greater than the limit velocity, then an enable signal and a control mode signal are generated, activating the braking torque regulation according to a conventional method. This is performed according to step 212. According to steps 210 and 212, the program is run through again with step 204 until the shutdown program is initiated and the system is shut down.

As described on the basis of FIG. 3, selection module 102 generates an init signal for the pre-drive check, which is performed in module 103 at a corresponding value of the operating status signal on the basis of the programs stored in memory 104. The program code of the pre-drive check is stored completely in the program memory of the wheel module, so that no input data is entered in this operating mode. In one example embodiment, however, starting data is relayed. Before beginning a trip, a check is performed to determine whether the system is functioning properly through corresponding assignment of a setpoint angle φsoll to angle-of-rotation regulator 105 and by acknowledgment of angle of rotation φmot of the engine. On assignment of a corresponding setpoint angle after expiration of a certain period of time, a corresponding actual angle is assumed. Regulator 105 operates as an angle-of-rotation regulator, i.e., depending on the deviation between the setpoint and actual value, a control signal is generated for engine 106, actuating wheel brake 107 accordingly. Successful implementation of the pre-drive check program, i.e. error-free implementation, is reported back to selection module 102 via a status signal. This module receives all the status signals and sends a status signal S_RM of the wheel module to the central or selected control unit over interface 101.

The procedure for initialization and implementation of the shutdown program is comparable. Selection module 102 generates an init signal when the corresponding operating state which initializes shutdown program 108 is present. Its program code is also stored completely in memory 104, so that here again no input data need be entered. Shutdown program 108 generates a setpoint angle of rotation which is set by regulator 105 according to the actual value detected. The correct execution of the shutdown program is monitored by shutdown program 108 on the basis of actual value φmot. The shutdown program generates a corresponding status signal for selection module 102 which sends a wheel module status signal S_RM outward as a function thereof.

In operating mode regulation, it is necessary to ensure in the case of braking torque regulation that there is reliable control or regulation of the vehicle brake even when the vehicle is at a standstill when no measurement of the braking torque is possible. Such a method is conventional. If the system is outside the standstill range, which is determined by selection module 102 on the basis of the vehicle velocity, then torque regulator 109 is activated by a corresponding enable signal. Furthermore regulator 105 is set for braking torque regulation by manner of a corresponding control mode signal from selection module 102. Module 109 forms a braking torque setpoint M_Br_soll as a function of the torque setpoint and optionally correction value M_dif for each individual wheel, and this braking torque setpoint is compared with the actual braking torque value in 110. The deviation goes to braking torque regulator 111 which selects a setpoint for regulator 105, which then regulates the setpoint by actuation of the wheel brake.

If the vehicle is in the standstill range, the braking torque regulation is deactivated (deletion of the enable signal) and angle-of-rotation regulator 112 is activated by a corresponding enable signal of the selection module. Regulator 105 is switched accordingly. Module 112 converts the setpoint torque assignment of the driver into a setpoint angle-of-rotation assignment on the basis of a characteristic curve which is adapted by module 113, i.e., it specifies a setpoint angle of rotation φsoll, which is set by the angle-of-rotation regulator. As an alternative, a fictitious actual braking torque is formed on the basis of the actual angle of rotation, in a conventional manner, and regulated by the torque regulator.

The statement of operating modes is obtained in an example embodiment. In other example embodiments, there may be other operating modes; e.g., switching of the regulator may be suitable in the case of braking force regulation at higher forces and/or at low forces, so that in this case the braking force exerted is to be analyzed as a selection criterion. Furthermore, in one example embodiment emergency operation is to be taken into account.

What is claimed is:

1. A method of operating a decentralized control system, comprising the steps of:
   controlling at least one first actuating element and at least one second actuating element by use of a respective one of at least two control units that are interconnected by at least one communication system;
   differentiating between at least two operating modes in control of the at least one first actuating element and the at least one second actuating element; and
   selecting a respective one of the at least two operating modes in each of the at least two control units on the basis of at least one signal supplied, wherein:
   the at least one signal includes an overall status signal of the decentralized control system,
   the status signal is output by one of the at least two control units,
   the at least one first actuating element and the at least one second actuating element are actuated as part of at least two regulation strategies,
   the selection of the respective one of the at least two operating modes is made as a function of at least one operating variable of the decentralized control system,
   the at least one first actuating element and the at least one second actuating element include respective wheel brake actuating elements that are actuated as part of a braking torque regulation, and in a vehicle standstill range are actuated as part of an angle-of-rotation regulation of the respective at least one first actuating element and the at least one second actuating elements, and
   a vehicle velocity is analyzed for selection of the respective one of the at least two operating modes.

2. The method according to claim 1, wherein:
   the at least two operating modes include pre-drive check and shutdown program.

3. The method according to claim 2, wherein:
   program codes performing at least one of the pre-drive check and the shutdown program are stored in the at least two control units, the program codes being implemented without an additional input signal from an outside source.

4. The method according to claim 1, wherein:
   the overall status signal is formed on the basis of individual operating status signals.

5. The method according to claim 1, wherein:
   in an event of a fault an additional operating mode is a limp-home operating mode that is selected in the at least two control units on the basis of at least one of a status signal of an overall vehicle and a status signal of the at two control units.

6. A device for operating a decentralized control system, comprising:
   at least one first actuating element and at least one second actuating element, a control of at least one of the actuating elements including at least two operating modes;
   at least two control units, each one of the at least two control units controlling at least one of the actuating elements; and
   an arrangement provided in the at least two control units and for selecting a respective one of the at least two operating modes on the basis of at least one status signal, wherein:
   the at least one status signal includes an overall status signal of the decentralized control system,
   the overall status signal is output by one of the at least two control units,
   the at least one first actuating element and the at least one second actuating element are actuated as part of at least two regulation strategies,
   the selection of the respective one of the at least two operating modes is made as a function of at least one operating variable of the decentralized control system,
   the at least one first actuating element and the at least one second actuating element include respective wheel brake actuating elements that are actuated as part of a braking torque regulation, and in a vehicle standstill range are actuated as part of an angle-of-rotation regulation of the respective at least one first actuating element and the at least one second actuating elements, and
   a vehicle velocity is analyzed for selection of the respective one of the at least two operating modes.

7. A storage medium for storing a computer program that when execution by a computer operates a decentralized control system in accordance with a method including:
   controlling at least one first actuating element and at least one second actuating element by use of a respective one of at least two control limits that are interconnected by at least one communication system;
   differentiating between at least two operating modes in control of the at least one first actuating element and the at least one second actuating element; and
   selecting a respective one of the at least two operating modes in each of the at least two control units on the basis of at least one signal supplied, wherein:
   the at least one signal includes an overall status signal of the decentralized control system,
   the status signal is output by one of the at least two control units,
   the at least one first actuating element and the at least one second actuating element are actuated as part of at least two regulation strategies,
   the selection of the respective one of the at least two operating modes is made as a function of at least one operating variable of the decentralized control system
   the at least one first actuating element and the at least one second actuating element include respective wheel brake actuating elements that are actuated as part of a braking torque regulation, and in a vehicle standstill range are actuated as part of an angle-of-rotation regulation of the respective at least one first actuating element and the at least one second actuating elements, and
   a vehicle velocity is analyzed for selection of the respective one of the at least two operating modes.

* * * * *